Feb. 13, 1934.  T. RUSSELL  1,947,113
BEAD CHAIN
Filed Oct. 12, 1931
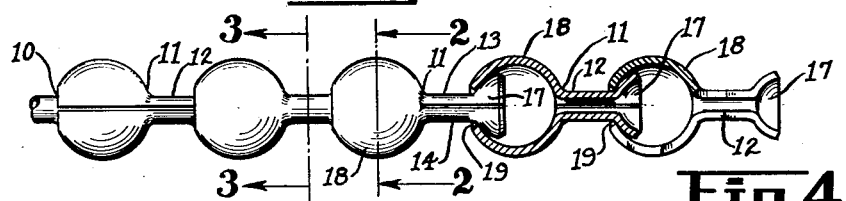
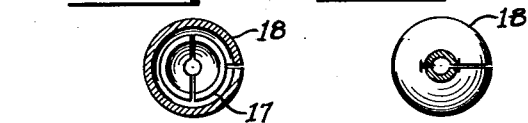
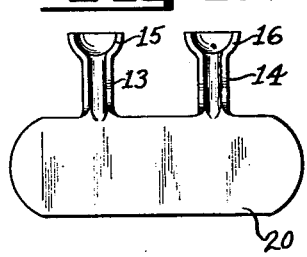
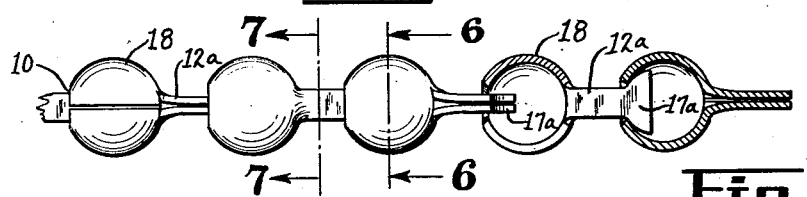
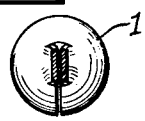
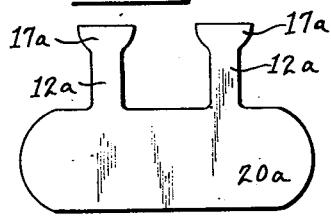
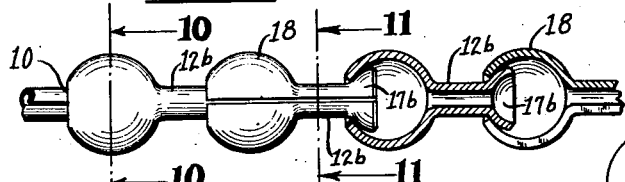
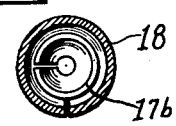
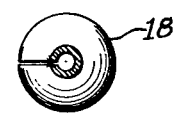
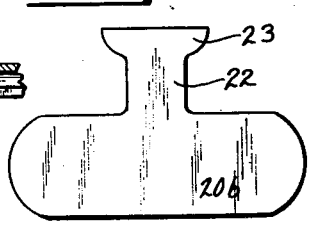
INVENTOR
Theodore Russell
BY HIS ATTORNEY
H. G. Manning Patented Feb. 13, 1934

1,947,113

UNITED STATES PATENT OFFICE 1,947,113

BEAD CHAIN

Theodore Russell, Naugatuck, Conn.

Application October 12, 1931. Serial No. 568,235

11 Claims. (Cl. 59—35)

This invention relates to flexible bead chains and more particularly to a chain in which each link is formed from flat sheet metal into a spherical head, shank, and locking shoe.

One object of this invention is to provide a bead chain of the above nature in which each link has a relatively large spherical head at one end and a relatively small split shoe at the other end, said links being directly connected to each other without the use of intermediate links.

A further object is to provide a bead chain of the above nature in which each link is made from a flat metal blank having a plurality of projecting arms provided with flared shoes on their extremities, said blank being adapted to be formed up into a hollow link comprising a connected head and shoe.

A further object is to provide a flexible bead chain of the above nature which will be simple in construction, inexpensive to manufacture, easy to assemble, compact, ornamental in appearance, and very efficient and durable in use.

With these and other objects in view there have been illustrated on the accompanying drawing three forms in which the invention may be conveniently embodied in practice.

In the drawing:

Fig. 1 represents a plan view of five links of the preferred form of bead chain, two of the links being shown in longitudinal section.

Fig. 2 is a transverse sectional view of one of the links taken along the line 2—2 of Fig. 1, looking in the direction of the arrows.

Fig. 3 is a transverse sectional view of the same, the section being taken along the line 3—3 of Fig. 1.

Fig. 4 is a development view of one of the original blanks from which the bead links are formed.

Figs. 5, 6, 7 and 8 are views similar to Figs. 1 to 4 inclusive, showing a modified form of bead chain construction.

Figs. 9, 10, 11 and 12 are views similar to Figs. 1 to 4 inclusive, showing another modified form of bead chain construction.

Referring now to the drawing in which like reference numerals denote corresponding parts throughout the several views, the numeral 10 indicates a section of the flexible bead chain of the prefered form comprising a series of directly connected hollow double-headed links 11. Each link 11 is provided with an intermediate neck 12 comprising a pair of semi-cylindrical shanks 13 and 14. The free ends of said shanks terminate in a pair of integral flaring concave extremities 15 and 16 of small diameter, as clearly shown in the development view in Fig. 4. The concave extremities 15 and 16, when bent together, form the opposing halves of a small two-part semi-spherical shoe 17.

The other end of each link consists of a folded spherical bead 18 of larger diameter than the semi-spherical shoe 17 and having a circular aperture 19 in its end through which the neck 12 of the next adjacent link is inserted in the process of manufacture. The spherical head 18 of each link is adapted to be formed out of an elongated flat blank 20 having initially convex extremities and to the upper edge of which are integrally connected the semi-cylindrical shanks 13 and 14 previously referred to (see Fig. 4).

Each two adjacent links are flexibly locked together by bending the flat blank 20 of one link around the neck 12 of the next link into spherical form by any suitable tools, not shown, in such a manner that the small shoe 17 of one link will be loosely fitted within the large spherical head 18 of the next link, thus forming a ball and socket joint.

In the modified form of bead chain shown in Figs. 5 to 8 inclusive, the construction is identical with that shown in Figs. 1 to 4 inclusive, except that the neck 12a and shoe 17a of each link is of flat instead of tubular and semi-spherical in construction. The development blank 20a of the modified form is shown in Fig. 8.

In the modified form of bead chain shown in Figs. 9 to 12 inclusive, the construction is also identical to that shown in Figs. 1 to 4 inclusive, except that the tubular neck 12b and shoe 17b of each link are formed from a single initially flat shank 22 and flat extremity 23 of a blank 20b, instead of a pair of concave shanks and concave extremities as in the first form.

It will be understood that while the necks and shoes of the bead chains herein disclosed are bent up from two shanks and a single shank respectively of the original blank, it is within the scope of the present invention to form the neck and shoe of three, four, or any other number of shanks.

Among the numerous advantages of the novel bead chain herein disclosed are its greater strength, more attractive appearance, and freedom from kinking. Moreover, the first and third forms of bead chain may be employed as flexible coverings for insulated wires and cables which may be readily threaded through the interior of the connected links thereof.

While there have been disclosed in this specification three forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a bead chain, a series of flexibly connected hollow links, each link being made from an individual blank, and having an intermediate split neck portion, a spherical split head connected to one end of said neck portion, and a smaller semi-spherical enlarged split shoe connected to the other end of said neck portion and fitted within the interior of the head of the next adjacent link, the entire length of each link being hollow to permit the insertion of an elongated flexible member therewithin.

2. In a bead chain, a series of flexibly connected hollow links, each link being made from an individual blank and having an intermediate tubular split neck portion, a spherical split head connected to one end of said neck portion, and a smaller semi-spherical enlarged shoe connected to the other end of said neck portion and fitted within the interior of the head of the next adjacent link, the entire length of each link being hollow to permit the insertion of an elongated flexible member therewithin.

3. In a bead chain, a series of flexibly connected hollow links, each link being made from an individual blank and having an intermediate split neck portion, a spherical head connected to one end of said neck portion, and a smaller semi-spherical enlarged split shoe connected to the other end of said neck portion and fitted within the interior of the head of the next adjacent link, said head being split at one side, the entire length of each link being hollow to permit the insertion of an elongated flexible member therewithin.

4. In a bead chain, a series of flexibly connected hollow links, each link being made from an individual blank and having an intermediate neck portion, a spherical head connected to one end of said neck portion, and a smaller semi-spherical enlarged shoe connected to the other end of said neck portion and fitted within the interior of the head of the next adjacent link, said neck and shoe being split throughout their lengths, the entire length of each link being hollow to permit the insertion of an elongated flexible member therewithin.

5. In a bead chain, a series of flexibly connected hollow links, each link being made from an individual blank and having an intermediate split neck portion, a spherical split head connected to one end of said neck portion, and a smaller semi-spherical enlarged split shoe connected to the other end of said neck portion and fitted within the interior of the head of the next adjacent link, said head having an aperture in its end to fit about the neck of the next adjacent link, the entire length of each link being hollow to permit the insertion of an elongated flexible member therewithin.

6. In a bead chain, a series of flexibly connected hollow links, each link being made from an individual blank and having an intermediate split neck portion, a spherical split head connected to one end of said neck portion, and a smaller semi-spherical enlarged split shoe connected to the other end of said neck portion and fitted within the interior of the head of the next adjacent link, all of the links of said chain being of identical shape, the entire length of each link being hollow to permit the insertion of an elongated flexible member therewithin.

7. In a bead chain, a series of flexibly connected hollow links, each link being made from an individual blank and having an intermediate neck split into a plurality of separate portions, a spherical split head connected to the ends of said neck portions, and a plurality of smaller outwardly concave enlarged split shoe sections connected to the other end of said neck portion and fitted within the interior of the head of the next adjacent link, said neck and shoe being hollow, the entire length of each link being hollow to permit the insertion of an elongated flexible member therewithin.

8. In a bead chain, a series of flexibly connected hollow links, each link being made from an individual blank and having an intermediate split neck comprising a pair of semi-tubular portions, a spherical split head connected to one end of said neck portions, and a pair of smaller semi-spherical enlarged split shoe sections connected to the other end of said neck portion and fitted within the interior of the head of the next adjacent link, said shoe being semi-spherical, the entire length of each link being hollow to permit the insertion of an elongated flexible member therewithin.

9. In a bead chain, a series of flexibly connected links, each having a hollow split head, a split neck and an enlarged split shoe, each link being formed by bending from an initially flat blank, all of the links of said chain being of identical shape, the entire length of each link being hollow to permit the insertion of an elongated flexible member therewithin.

10. The process of constructing a bead chain which comprises bending up a series of links successively from a series of flat blanks, each having connected heads, necks, and shoe sections, into the form of a connected hollow split head, a hollow split neck, and a hollow split shoe section, and said links being formed in such a manner that the neck and shoe of each link is fitted into the interior of the head of the next adjacent link to form a continuous flexible chain.

11. The process of constructing a bead chain which comprises bending up a series of links successively from a series of flat blanks, each having a connected head and a pair of necks with enlarged shoe extremities thereon, into the form of a connected hollow split head, a hollow split neck, and a hollow split shoe section, and said links being formed in such a manner that the neck and shoe of each link is fitted into the interior of the head of the next adjacent link to form a continuous flexible chain.

THEODORE RUSSELL.